United States Patent
Cicha et al.

[11] Patent Number: 5,879,652
[45] Date of Patent: Mar. 9, 1999

[54] PROCESS FOR PRODUCING OXOCHLORIDES OF SULFUR

[75] Inventors: Walter Vladimir Cicha; Leo Ernest Manzer, both of Wilmington, Del.

[73] Assignee: E. I. du Pont de Nemours and Company, Wilmington, Del.

[21] Appl. No.: 881,232

[22] Filed: Jun. 24, 1997

Related U.S. Application Data

[60] Provisional application No. 60/022,498, Jun. 28, 1996.

[51] Int. Cl.$^6$ .................................................... C01B 17/45
[52] U.S. Cl. ........................................... 423/468; 423/467
[58] Field of Search ...................................... 423/467, 469

[56] References Cited

U.S. PATENT DOCUMENTS

| | | | |
|---|---|---|---|
| 1,462,752 | 7/1923 | Jacobs | 423/468 |
| 1,765,688 | 6/1930 | McKee et al. | 423/468 |
| 2,377,217 | 5/1945 | Dvornikoff et al. | 423/468 |
| 2,431,823 | 12/1947 | Pechukas | 423/468 |
| 4,231,959 | 11/1980 | Obrecht | 562/847 |
| 4,496,664 | 1/1985 | Motojima | 588/901 |
| 4,764,308 | 8/1988 | Sauer et al. | 562/847 |
| 4,820,884 | 4/1989 | Weigert | 570/156 |
| 4,914,070 | 4/1990 | Ledoux et al. | 502/178 |
| 4,978,649 | 12/1990 | Surovikin et al. | 502/416 |
| 5,136,113 | 8/1992 | Rao | 570/176 |
| 5,498,400 | 3/1996 | Hill | 423/300 |

FOREIGN PATENT DOCUMENTS

| | | | |
|---|---|---|---|
| 1068229 | 11/1959 | Germany | 423/468 |
| HEI 6-29129 | 4/1994 | Japan . | |
| 854875 | 9/1981 | U.S.S.R. | 423/468 |
| WO 97/30932 | 8/1997 | WIPO . | |

OTHER PUBLICATIONS

Marc. J. Ledoux et al., New Synthesis and Uses of High–Specific–Surface SiC as a Catalytic Support that is Chemically Inert and Has High Thermal Resistance, *Journal of Catalysis*, 114, 176–185, Apr. 11, 1988.

Ullmann's Encyclopedia of Industrial Chemistry 5$^{th}$ Edition, vol. A25, pp. 627–629, (No date).

*Primary Examiner*—Ngoc-Yen Nguyen

[57] ABSTRACT

A process for producing sulfuryl chloride and/or thionyl chloride is disclosed which involves contacting a mixture comprising $SO_2$ and $Cl_2$ (e.g., at about 300° C. or less) with carbon having an active metal content of less than 1000 ppm by weight and a high degree of oxidative stability (i.e., a weight loss of about 12%, or less, in the WVC Temperature Test as defined herein).

6 Claims, No Drawings

PROCESS FOR PRODUCING OXOCHLORIDES OF SULFUR

This application claims the priority benefit of U.S. Provisional Application 60/022,498, filed Jun. 28, 1996.

FIELD OF THE INVENTION

This invention relates to a process for the manufacture of sulfuryl chloride and/or thionyl chloride by the reaction of chlorine ($Cl_2$) with sulfur dioxide ($SO_2$) in the presence of a carbon catalyst. More particularly, this invention relates to a process for the manufacture of sulfuryl chloride and/or thionyl chloride with minimal catalyst degradation.

BACKGROUND

The production of sulfuryl chloride by the reaction of chlorine with sulfur dioxide in the presence of a carbon catalyst is a well known process. Typically, chlorine and sulfur dioxide are dissolved in a solvent (e.g., sulfuryl chloride) before contact with a carbon catalyst (see U.S. Pat. No. 5,498,400). Thionyl chloride is typically made by reacting sulfur dioxide with chlorine and sulfur dichloride in the presence of a carbon catalyst (see, e.g., Ullmann's Encyclopedia of Industrial Chemistry $5^{th}$ edition, Vol. A25, pp. 627–629). Carbon catalysts are known to degrade during such processes. Therefore, there is an interest in developing processes in which the amount of carbon degradation is minimized.

SUMMARY OF THE INVENTION

A process for producing at least one of sulfuryl chloride and thionyl chloride is provided which comprises contacting a mixture comprising sulfur dioxide and chlorine with carbon. In accordance with this invention, the carbon (1) has an active metal content of less than 1000 ppm by weight, and (2) loses about 12% of its weight, or less, when sequentially heated in air for the following times and temperatures; 125° C. for 30 minutes, 200° C. for 30 minutes, 300° C. for 30 minutes, 350° C. for 45 minutes, 400° C. for 45 minutes, 450° C. for 45 minutes and finally at 500° C. for 30 minutes. Typically the contact is at a temperature of about 300° C., or less.

DETAILED DESCRIPTION

In accordance with this invention, oxychloride of sulfur (i.e., $SO_2Cl_2$ and/or $SOCl_2$) is produced using a carbon which resists degradation. The formation of $SO_2Cl_2$ is low at higher temperatures (e.g., temperatures above 100° C.).

An important aspect of the present invention relates to improving the production of sulfuryl chloride produced by contacting sulfur dioxide and chlorine with carbon. The improvement can be employed in connection with any of those carbon-based processes used commercially or described in the art (e.g., the process disclosed in U.S. Pat. No. 5,498,400 for the production of sulfuryl chloride).

The reaction is strongly exothermic. The reaction may be done in the vapor phase; more typically, the reaction is done by dissolving the chlorine and sulfur dioxide reactants in a solvent such as carbon tetrachloride or sulfuryl chloride itself, and passing the solution over the catalyst.

As used in connection with this invention, the term "active metals" means metals included in the group consisting of transition metals of groups 3 to 10, boron, aluminum and silicon. Carbon which contains less than about 1000 ppm by weight of active metals is employed. Iron is considered a particularly harmful active metal (i.e., the greater the amount of iron the larger the amount of carbon tetrachloride produced). It is preferred to use carbons which not only have an active metal content of less than about 1000 ppm by weight, but also contain less than about 100 ppm by weight of iron (and more preferably less than about 80 ppm by weight iron). It is also preferable to use carbons which contain less than 200 ppm by weight of sulfur and less than 200 ppm by weight of phosphorus (and more preferably less than 100 ppm by weight each, of phosphorus and sulfur). The carbons used for the process of this invention also exhibit substantial weight stability when heated in air. More particularly, when heated in air at 125° C. for 30 minutes, followed by heating at 200° C. for 30 minutes, followed by heating at 300° C. for 30 minutes, followed by heating at 350° C. for 45 minutes, followed by heating at 400° C. for 45 minutes, followed by heating at 450° C. for 45 minutes and finally followed by heating at 500° C. for 30 minutes, the carbons employed for the process of this invention lose about 12% of their weight, or less. This sequence of time and temperature conditions for evaluating the effect of heating carbon samples in air is defined herein as the "WVC Temperature Test". The WVC Temperature Test may be run using thermal gravimetric analysis (TGA). Carbons which when subjected to the WVC Temperature Test lose about 12% of their weight, or less, are considered to be advantageously oxidatively stable.

Carbon from any of the following sources are useful for the process of this invention; wood, peat, coal, coconut shells, bones, lignite, petroleum-based residues and sugar. Commercially available carbons which may be used in this invention include those sold under the following trademarks: Barneby & Sutcliffe™, Darco™, Nuchar™, Columbia JXN™, Columbia LCK™, Calgon PCB™, Calgon BPL™, Westvaco™, Norit™ and Barnaby Cheny NB™. The carbon support can be in the form of powder, granules, or pellets, or the like.

Preferred carbons include acid-washed carbons (e.g., carbons which have been treated with hydrochloric acid or hydrochloric acid followed by hydrofluoric acid). Acid treatment is typically sufficient to provide carbons which contain less than 1000 ppm of active metals. Suitable acid treatment of carbons is described in U.S. Pat. No. 5,136,113. Particularly preferred carbons include three dimensional matrix porous carbonaceous materials. Examples are those described in U.S. Pat. No. 4,978,649, which is hereby incorporated by reference herein in its entirety. Of note are three dimensional matrix carbonaceous materials which are obtained by introducing gaseous or vaporous carbon-containing compounds (e.g., hydrocarbons) into a mass of granules of a carbonaceous material (e.g., carbon black); decomposing the carbon-containing compounds to deposit carbon on the surface of the granules; and treating the resulting material with an activator gas comprising steam to provide a porous carbonaceous material. A carbon-carbon composite material is thus formed.

The carbon surface area as determined by BET measurement is preferably greater than about 100 $m^2/g$ and more preferably greater than about 300 $m^2/g$.

It is known from dissociation equilibria that at 70° C., (b.p. of sulfryl chloride at 1 atm. is 69.1 ° C.), about 50% of the sulfuryl chloride is dissociated into sulfur dioxide and chlorine, and that at about 120° C. the sulfuryl chloride is almost completely dissociated. Accordingly, the temperature of the sulfuryl chloride reaction is typically about 70° C., or less (e.g., in the range of from 0° C. to 70° C.). Preferably, the temperature of the process is from about 0° C. to 30° C.

We have found that carbon catalyst degradation during production of oxochlorides of sulfur is accompanied by the production of carbon tetrachloride (formed by the reaction of chlorine with the carbon catalyst). Thus, the carbon tetrachloride formation is considered to be inversely correlated to catalyst life (i.e., the more carbon tetrachloride produced, the shorter the catalyst life). The use of the oxidatively stable carbons results in reducing the carbon tetrachloride formation and in increased catalyst life. Moreover, the use of oxidatively stable carbons which in accordance with this invention have low active metal contents, further improves catalyst life.

Without further elaboration, it is believed that one skilled in the art can, using the description herein, utilize the present invention to its fullest extent. The following specific embodiments are, therefore, to be construed as merely illustrative, and does not constrain the remainder of the disclosure in any way whatsoever.

EXAMPLES

General Reaction Procedure

A ½" (1.27 mm) O.D. ×15" (381 mm) Inconel™ 600 nickel alloy tube containing a 100 mesh (0.015 mm) Monel™ nickel alloy screen is used as the reactor. The reactor is charged with about 8 mL of the respective carbon catalysts. The presence of $SO_2Cl_2$ and/or $SOCl_2$ is confirmed by GC/mass spectral analysis.

General Analytical Procedure

The reactor efflluent is sampled on-line with a Hewlett Packard HP 5890 gas chromatograph using a 1.05 m long, 0.25 mm I.D. column containing Restak% RTX-1 Crossbond 100% dimethyl polysiloxane. Gas chromatographic conditions are 50° C. for 10 minutes followed by temperature programming to 200° C. at a rate of 15° C./minute. The smallest amount of carbon tetrachloride that can be quantitatively identified is about 40 ppm by weight.

Thermal Analysis Procedure

Thermal gravimetric analysis (TGA) is done using a TA Instruments analyzer. The TGA experiments are done in air at a flow rate of 80 mL/min. The carbon sample is heated in air for the following times and temperatures: 125° C. for 30 minutes, 200° C. for 30 minutes, 300° C. for 30 minutes, 350° C. for 45 minutes, 400° C. for 45 minutes, 450° C. for 45 minutes and finally at 500° C. for 30 minutes. The weight loss is measured after completion of the heating cycle.

EXAMPLE 1

The carbon sample is a three-dimensional porous carbonaceous carbon. The active metal content of the carbon is about 600 ppm and the surface area is about 400 m²/g. The weight loss for this carbon under the thermal analysis procedure is less than 10%. The reaction is run at temperatures of 30° C., 125° C. and 300° C. A 1:1 molar ratio mixture of sulfur dioxide and chlorine is passed over the catalyst. At 30° C. and a 10 second contact time, the presence of $SO_2Cl_2$ is confirmed by GC/mass spec analysis and no $CCl_4$ is detected. At 125° C. and an 18 second contact time, the presence of a small amount of $SOCl_2$ is detected by GC/mass spec analysis. No $CCl_4$ and no $SO_2Cl_2$ are detected. At 300° C. and a 12 second contact time, the presence of $SOCl_2$ and a trace amount (<40 ppm by weight) of $CCl_4$ are detected by GC/mass spec analysis. No $SO_2Cl_2$ is detected.

COMPARATIVE EXAMPLE

The Comparative Example is run under the same conditions as the example above using a commercially available acid-washed carbon with an active metal content of about 1.0. The weight loss for this carbon under the thermal analysis procedure is also less than 10%. At 125° C. and an 18 second contact time, the presence of a small amount of $SOCl_2$ and a trace of $SO_2Cl_2$ are detected by GC/mass spec analysis. No $CCl_4$ is detected. At 300° C. and a 12 second contact time, the presence of $SOCl_2$ and significant amounts (about 300 ppm by weight) of $CCl_4$ are detected by GC/mass spec analysis. No $SO_2Cl_2$ is detected.

What is claimed is:

1. A process for producing at least one of sulfuryl chloride and thionyl chloride, comprising:

contacting a mixture comprising $SO_2$ and $Cl_2$ at about 300° C. or less with carbon having an active metal content of less than 1000 ppm by weight and a weight loss of about 12%, or less, in the WVC Temperature Test.

2. The process of claim 1 wherein sulfuryl chloride is produced and the catalyst contact is at a temperature in the range of from 0° C. to 70° C.

3. The process of claim 2 wherein the carbon is acid-washed.

4. The process of claim 2 wherein the carbon is a three-dimensional matrix carbonaceous material.

5. The process of claim 2 wherein the carbon is obtained by introducing gaseous or vaporous hydrocarbons into a mass of carbon black granules; decomposing the hydrocarbons to deposit carbon on the surface of the granules; and treating the resulting material with an activator gas comprising steam to provide a porous carbonaceous material.

6. The process of claim 2 wherein the carbon contains less than about 100 ppm by weight iron.

* * * * *